US012189345B2

(12) United States Patent
Miyakawa et al.

(10) Patent No.: US 12,189,345 B2
(45) Date of Patent: Jan. 7, 2025

(54) ATOMIC CELL, METHOD FOR MANUFACTURING ATOMIC CELL, AND QUANTUM INTERFERENCE DEVICE

(71) Applicant: SEIKO EPSON CORPORATION, Tokyo (JP)

(72) Inventors: Takuya Miyakawa, Matsumoto (JP); Yasushi Tsuchiya, Fujimi (JP)

(73) Assignee: SEIKO EPSON CORPORATION (JP)

( * ) Notice: Subject to any disclaimer, the term of this patent is extended or adjusted under 35 U.S.C. 154(b) by 129 days.

(21) Appl. No.: 18/111,915

(22) Filed: Feb. 21, 2023

(65) Prior Publication Data

US 2023/0266716 A1 Aug. 24, 2023

(30) Foreign Application Priority Data

Feb. 22, 2022 (JP) ................................ 2022-025385

(51) Int. Cl.
*G04F 5/14* (2006.01)

(52) U.S. Cl.
CPC .................................... *G04F 5/145* (2013.01)

(58) Field of Classification Search
CPC .................................. G04F 5/145; H03L 7/26
See application file for complete search history.

(56) References Cited

U.S. PATENT DOCUMENTS

2017/0244419 A1* 8/2017 Hayashi .................... H03L 7/26

FOREIGN PATENT DOCUMENTS

JP 2017-152676 A 8/2017

* cited by examiner

*Primary Examiner* — G.M. A Hyder
(74) *Attorney, Agent, or Firm* — Harness, Dickey & Pierce, P.L.C.

(57) ABSTRACT

An atomic cell filled with an alkali metal includes: a substrate; a first coating layer provided on an inner wall of the substrate and derived from a first molecule; a second coating layer provided on the first coating layer, and derived from a second molecule having a non-polar group and a reactive group that undergoes a desorption reaction with the first molecule; and a third coating layer provided on the second coating layer and derived from a non-polar third molecule. The third coating layer has a degree of crystallinity of 70% or more.

19 Claims, 7 Drawing Sheets

ATOMIC CELL, METHOD FOR MANUFACTURING ATOMIC CELL, AND QUANTUM INTERFERENCE DEVICE

The present application is based on, and claims priority from JP Application Serial Number 2022-025385, filed Feb. 22, 2022, the disclosure of which is hereby incorporated by reference herein in its entirety.

BACKGROUND

1. Technical Field

The present disclosure relates to an atomic cell, a method for manufacturing an atomic cell, and a quantum interference device.

2. Related Art

An operation principle of an atomic oscillator is roughly divided into a method using a double resonance phenomenon due to light and microwaves, and a method using a coherent population trapping (CPT) using two types of light having different wavelengths, and any atomic oscillator includes a gas cell in which an alkali metal is sealed. A coating layer is provided on an inner wall of the gas cell in order to prevent relaxation of an electron spin state of the alkali metal.

JP-A-2017-152676 discloses an atomic cell including a first coating layer that coats an inner wall, a second coating layer that coats the first coating layer, and a third coating layer that coats the second coating layer. In addition, JP-A-2017-152676 discloses that the first coating layer is formed of a metal oxide that does not react with an alkali metal, the second coating layer is formed of an alkylsilane that reacts with the metal oxide, and the third coating layer is formed of polypropylene, polyethylene, or polymethylpentene that is a third molecule.

According to the atomic cell including such three coating layers, even when the alkali metal enters the coating layers, the peeling of the coating layers can be prevented. Accordingly, an effect of preventing the relaxation of the electron spin state of the alkali metal can be attained.

Although the atomic cell described in JP-A-2017-152676 includes the third coating layer having a structure derived from the third molecule, the third coating layer does not have a high crystallinity. Therefore, there is a problem that the effect of preventing the relaxation of the electron spin state of the alkali metal is insufficient.

SUMMARY

An atomic cell according to an application example of the present disclosure is an atomic cell filled with an alkali metal, the atomic cell including:

- a substrate;
- a first coating layer provided on an inner wall of the substrate and derived from a first molecule;
- a second coating layer provided on the first coating layer, and derived from a second molecule having a non-polar group and a reactive group that undergoes a desorption reaction with the first molecule; and
- a third coating layer provided on the second coating layer and derived from a non-polar third molecule, in which the third coating layer has a degree of crystallinity of 70% or more.

A method for manufacturing the atomic cell according to the application example of the present disclosure is a method for manufacturing an atomic cell filled with an alkali metal, the method including:

- forming a first coating layer by supplying a first molecule to an inner wall of a substrate;
- forming a second coating layer by supplying, to the first coating layer, a second molecule having a non-polar group and a reactive group that undergoes a desorption reaction with the first coating layer; and
- forming a third coating layer by supplying a non-polar third molecule to the second coating layer, in which
- the third coating layer has a degree of crystallinity of 70% or more.

A quantum interference device according to the application example of the present disclosure includes:

- the atomic cell according to the application example of the present disclosure;
- a light emitting unit configured to emit excitation light for exciting the alkali metal; and
- a light detection unit configured to detect the excitation light transmitted through the atomic cell.

DESCRIPTION OF EXEMPLARY EMBODIMENTS

Hereinafter, preferred embodiments of an atomic cell, a method for manufacturing an atomic cell, and a quantum interference device according to the present disclosure will be described in detail with reference to the accompanying drawings.

1. Quantum Interference Device

First, an atomic oscillator 200 which is a quantum interference device according to an embodiment will be described. In addition to the atomic oscillator 200, the quantum interference device according to the present disclosure can also be applied to, for example, a magnetic sensor, a quantum memory, an atomic gyroscope, or the like.

Figure 1:
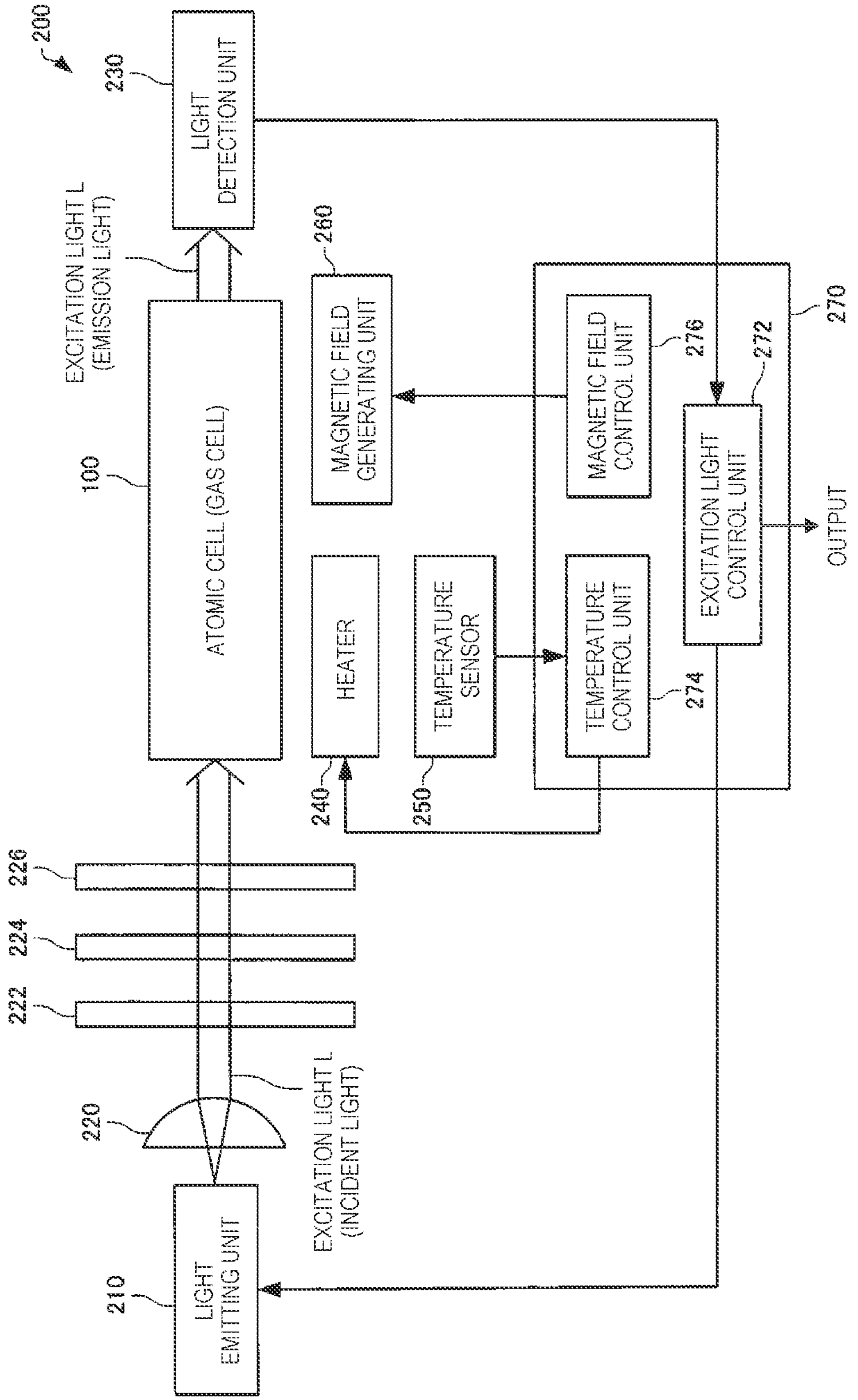
FIG. 1 is a functional block diagram showing an atomic oscillator which is a quantum interference device according to an embodiment.
Figure 2:
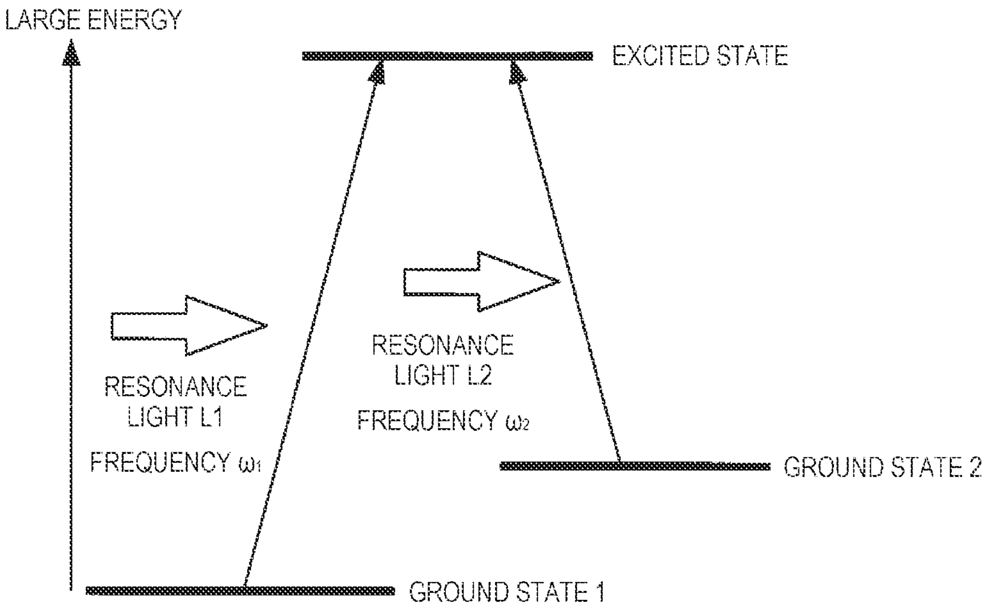
FIG. 2 is a diagram showing an energy state of an alkali metal in an atomic cell of the atomic oscillator shown in FIG. 1.
Figure 3:
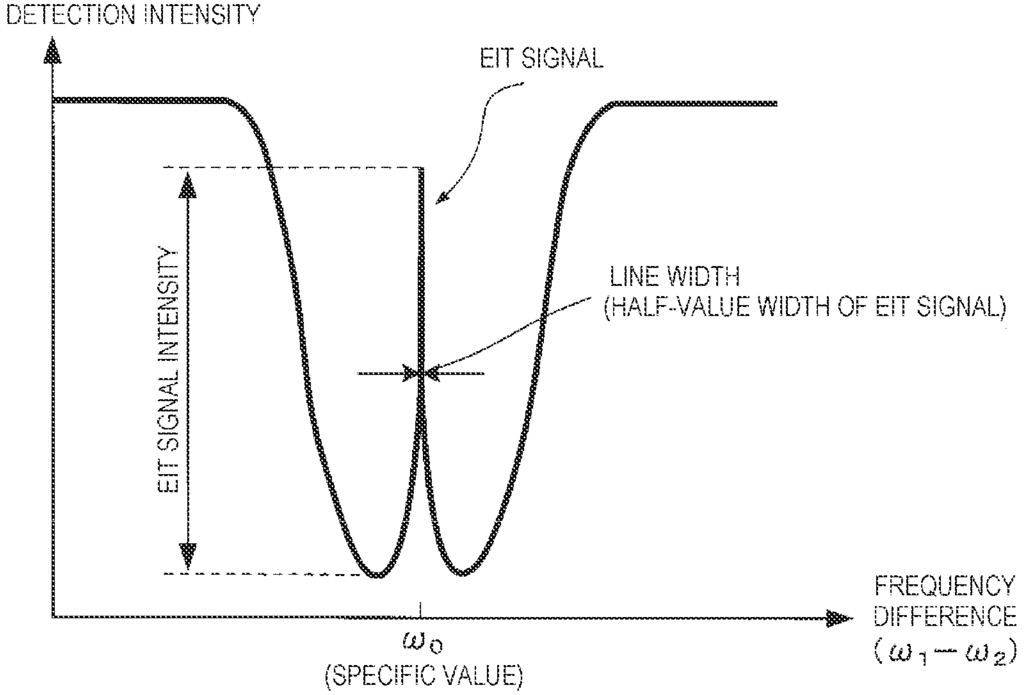
FIG. 3 is a graph showing a relationship between a frequency difference in two types of light emitted from a light emitting unit and a detection intensity detected by a light detection unit in the atomic oscillator shown in FIG. 1.
Figure 4:
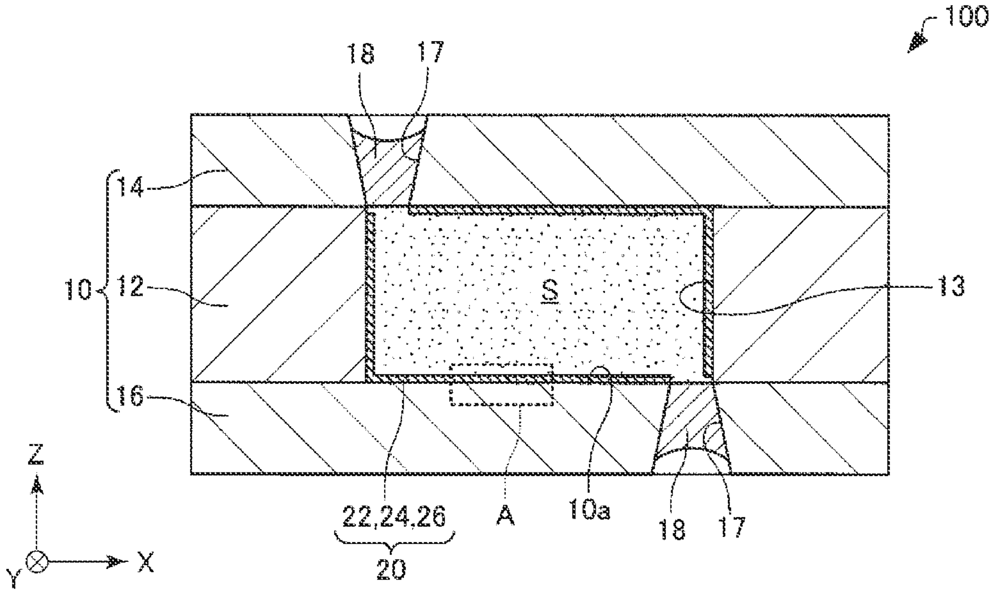
FIG. 4 is a cross-sectional view schematically showing the atomic cell shown in FIG. 1.

FIG. 1 is a functional block diagram showing the atomic oscillator 200 which is the quantum interference device according to the embodiment. FIG. 2 is a diagram showing an energy state of an alkali metal in an atomic cell 100 of the atomic oscillator 200 shown in FIG. 1. FIG. 3 is a graph showing a relationship between a frequency difference in two types of light emitted from a light emitting unit and a detection intensity detected by a light detection unit in the atomic oscillator 200 shown in FIG. 1. FIG. 4 is a cross-sectional view schematically showing the atomic cell 100 shown in FIG. 1.

1.1. Atomic Oscillator

The atomic oscillator 200 is an atomic oscillator using a coherent population trapping. The atomic oscillator 200 using the coherent population trapping can be reduced in size as compared with an atomic oscillator using a double resonance effect.

As shown in FIG. 1, the atomic oscillator 200 includes the atomic cell 100, a light emitting unit 210, optical components 220, 222, 224, and 226, a light detection unit 230, a heater 240, a temperature sensor 250, a magnetic field generating unit 260, and a control unit 270.

An alkali metal in a gaseous state is sealed in the atomic cell 100. Examples of the alkali metal include rubidium, cesium, and sodium.

As shown in FIG. 2, the alkali metal has three-level energy levels, and has three states, that is, an excited state and two ground states (ground states 1 and 2) having different energy levels. Here, the ground state 1 is an energy state lower than that of the ground state 2.

With respect to the alkali metal in the gaseous state, when the alkali metal in the gaseous state is irradiated with the two types of resonance light L1 and L2 having different frequencies, a light absorptance (light transmittance) in the alkali metal of the resonance light L1 or L2 changes according to a difference ($\omega_1$-$\omega_2$) between a frequency $\omega_1$ of the resonance light L1 and a frequency $\omega_2$ of the resonance light L2. When the difference ($\omega_1$-$\omega_2$) between the frequency $\omega_1$ of the resonance light L1 and the frequency $\omega_2$ of the resonance light L2 coincides with a frequency corresponding to an energy difference between the ground state 1 and the ground state 2, the excitation from the ground states 1 and 2 to the excited state is stopped. At this time, the resonance light L1 and L2 are both transmitted without being absorbed by the alkali metal. Such a phenomenon is called a CPT phenomenon or an electromagnetically induced transparency (EIT) phenomenon.

Here, for example, when the frequency $\omega_1$ of the resonance light L1 is fixed and the frequency $\omega_2$ of the resonance light L2 is changed, when the difference ($\omega_1$-$\omega_2$) between the frequency $\omega_1$ of the resonance light L1 and the frequency $\omega_2$ of the resonance light L2 coincides with a frequency $\omega_0$ corresponding to the energy difference between the ground state 1 and the ground state 2, a detection intensity of the light detection unit 230 increases rapidly as shown in FIG. 3. Such a steep signal is referred to as an EIT signal. The EIT signal has an eigenvalue determined by the type of the alkali metal. Therefore, by using the EIT signal as a reference, it is possible to implement the atomic oscillator 200 with high accuracy. Hereinafter, units of the atomic oscillator 200 will be described in order.

1.1.1. Light Emitting Unit

The light emitting unit 210 emits an excitation light L for exciting the alkali metal in the atomic cell 100. Specifically, the light emitting unit 210 emits two types of light (resonance light L1 and resonance light L2) having different frequencies as described above as the excitation light L.

The resonance light L1 excites the alkali metal in the atomic cell 100 from the above-described ground state 1 to the excited state. On the other hand, the resonance light L2 excites the alkali metal in the atomic cell 100 from the above-described ground state 2 to the excited state.

The light emitting unit 210 is not particularly limited as long as the light emitting unit 210 can emit the excitation light as described above, and for example, a semiconductor laser such as a vertical cavity surface emitting laser (VCSEL) is used.

The light emitting unit 210 is coupled to an excitation light control unit 272 of the control unit 270, which will be described later, and is driven and controlled based on a detection result of the light detection unit 230. A temperature of the light emitting unit 210 is adjusted to a predetermined temperature by a temperature control element (not shown) such as a heating resistor and a Peltier element.

1.1.2. Optical Component

The optical components 220, 222, 224, and 226 are provided on an optical path of the excitation light L between the light emitting unit 210 and the atomic cell 100. In the example shown in FIG. 1, the first optical component 220, the second optical component 222, the third optical component 224, and the fourth optical component 226 are disposed in this order from the light emitting unit 210 toward the atomic cell 100.

The first optical component 220 is a collimator lens. The first optical component 220 can irradiate the atomic cell 100 with the excitation light L without waste. The first optical component 220 has a function of converting the excitation light L into parallel light. Therefore, it is possible to easily prevent the excitation light L from being reflected by an inner wall of the atomic cell 100. Accordingly, the resonance of the excitation light in the atomic cell 100 is suitably generated, and as a result, oscillation characteristics of the atomic oscillator 200 can be improved.

The second optical component 222 is a polarizing plate. The second optical component 222 can adjust the polarization of the excitation light L from the light emitting unit 210 in a predetermined direction.

The third optical component 224 is a neutral density filter (ND filter). The third optical component 224 can adjust (decrease) an intensity of the excitation light L incident on the atomic cell 100. Therefore, even when an output of the light emitting unit 210 is large, the excitation light incident on the atomic cell 100 can be set to a desired light amount.

The fourth optical component 226 is a $\lambda/4$ wave plate. The fourth optical component 226 can convert the excitation light L, which is from the light emitting unit 210, from linearly polarized light to circularly polarized light (right-handed circularly polarized light or left-handed circularly polarized light).

1.1.3. Light Detection Unit

The light detection unit 230 detects the intensity of the excitation light L (resonance light L1 and L2) transmitted through the atomic cell 100. The light detection unit 230 is not particularly limited as long as the light detection unit 230 can detect the excitation light L, and for example, a light detector (light receiving element) such as a solar cell or a photodiode is used. The light detection unit 230 is coupled to the excitation light control unit 272 of the control unit 270, which will be described later.

1.1.4. Heater

The heater 240 heats the atomic cell 100. Accordingly, the alkali metal in the atomic cell 100 can be maintained in the gaseous state at an appropriate concentration. The heater 240 generates heat by energization, and includes, for example, two heating resistors (not shown) provided on an outer surface of the atomic cell 100. The heater 240 is electrically coupled to a temperature control unit 274 of the control unit 270, which will be described later.

As will be described later, the atomic cell 100 shown in FIG. 4 has window portions 14 and 16 through which the excitation light L passes. One of the heating resistors is provided on the window portion 14, which is an incident side window portion, and the other heating resistor is provided on the window portion 16, which is an emission side window portion. Such a heating resistor is made of a material having transparency to the excitation light L, for example, a transparent electrode material of an oxide such as indium tin oxide (ITO), indium zinc oxide (IZO), $In_3O_3$, $SnO_2$, Sb-containing $SnO_2$, or Al-containing ZnO.

The heating resistor can be formed by, for example, a CVD method such as plasma CVD or thermal CVD, a dry plating method such as vacuum deposition, or a sol-gel method.

The heater 240 is not limited to the above-described form as long as the heater 240 can heat the atomic cell 100, and various types of heaters can be used. In addition, the heater 240 may be in non-contact with the atomic cell 100. The atomic cell 100 may be heated using the Peltier element instead of the heater 240 or in combination with the heater 240.

1.1.5. Temperature Sensor

The temperature sensor 250 detects a temperature of the heater 240 or the atomic cell 100. Then, a heat generating amount of the heater 240 is controlled based on a detection result of the temperature sensor 250. Accordingly, the alkali metal in the atomic cell 100 can be maintained at a desired temperature. An installation position of the temperature sensor 250 is not particularly limited, and may be, for example, on the heater 240 or on the outer surface of the atomic cell 100.

The temperature sensor 250 is not particularly limited, and various known temperature sensors such as a thermistor and a thermocouple can be used. The temperature sensor 250 is electrically coupled to the temperature control unit 274 of the control unit 270, which will be described later, via a wiring (not shown).

1.1.6. Magnetic Field Generating Unit

The magnetic field generating unit 260 generates a magnetic field for Zeeman splitting a plurality of energy levels in which the alkali metal in the atomic cell 100 is degraded. Accordingly, a gap between different energy levels in which the alkali metal is degraded can be expanded, and a resolution can be improved. As a result, accuracy of an oscillation frequency of the atomic oscillator 200 can be improved.

The magnetic field generating unit 260 is implemented by, for example, a Helmholtz coil that sandwiches the atomic cell 100 or a solenoid coil that covers the atomic cell 100. Accordingly, a uniform magnetic field in one direction can be generated in the atomic cell 100. The magnetic field generated by the magnetic field generating unit 260 is a constant magnetic field (DC magnetic field), and an AC magnetic field may be superimposed. The magnetic field generating unit 260 is electrically coupled to a magnetic field control unit 276 of the control unit 270, which will be described later, and is energized and controlled.

1.1.7. Control Unit

The control unit 270 controls operations of the light emitting unit 210, the heater 240, and the magnetic field generating unit 260. The control unit 270 includes the excitation light control unit 272 that controls the frequencies of the resonance light L1 and L2 of the light emitting unit 210, the temperature control unit 274 that controls the temperature of the alkali metal in the atomic cell 100, and the magnetic field control unit 276 that controls the magnetic field from the magnetic field generating unit 260.

The excitation light control unit 272 controls, based on the detection result of the light detection unit 230, the frequencies of the resonance light L1 and L2 emitted from the light emitting unit 210. Specifically, the excitation light control unit 272 controls the frequencies of the resonance light L1 and L2 emitted from the light emitting unit 210 such that the difference ($\omega_1$-$\omega_2$) between the frequency $\omega_1$ and the frequency $\omega_2$ detected by the light detection unit 230 is the frequency $\omega_0$ specified by the above-described alkali metal. In addition, the excitation light control unit 272 controls center frequencies of the resonance light L1 and L2 emitted from the light emitting unit 210. Further, although not shown, the excitation light control unit 272 includes a voltage-controlled crystal oscillator (oscillation circuit), and outputs an oscillation frequency of the voltage-controlled crystal oscillator as an output signal of the atomic oscillator 200 while synchronizing and adjusting the oscillation frequency based on the detection result of the light detection unit 230.

The temperature control unit 274 controls the energization of the heater 240 based on the detection result of the temperature sensor 250. Accordingly, the temperature of the atomic cell 100 can be maintained within a desired range.

The magnetic field control unit 276 controls the energization of the magnetic field generating unit 260 such that the magnetic field generated by the magnetic field generating unit 260 is constant.

Such a control unit 270 is provided in, for example, an integrated circuit (IC) chip mounted on a substrate.

2. Atomic Cell

Next, the atomic cell 100 according to the embodiment will be described.

Figure 5:
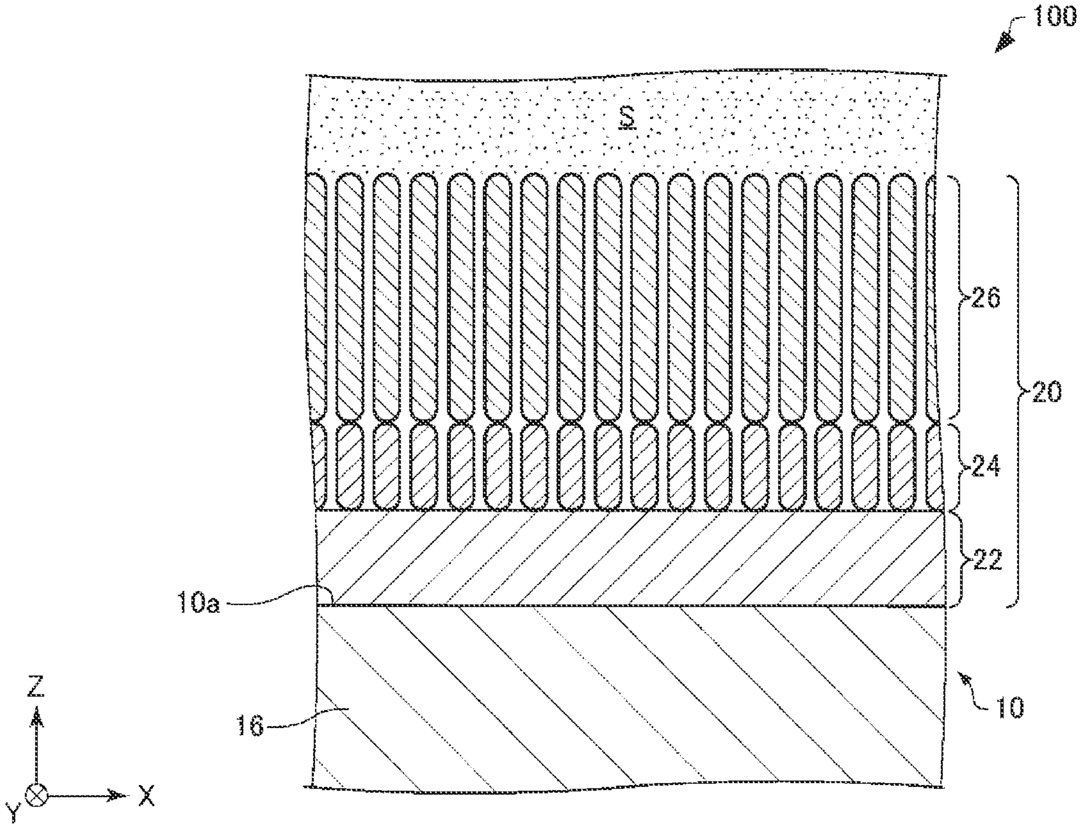
FIG. 5 is an enlarged view of a region A shown in FIG. 4.
Figure 6:
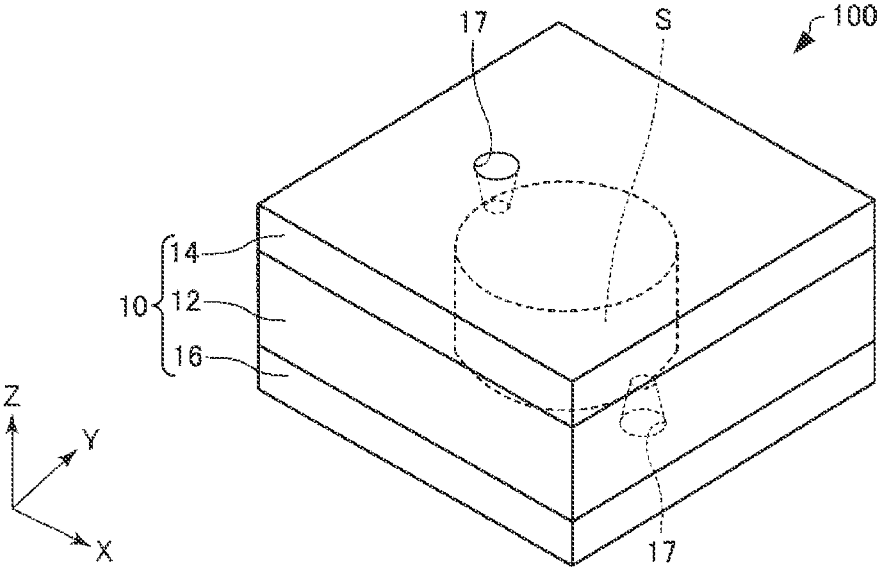
FIG. 6 is a perspective view schematically showing the atomic cell according to the embodiment.

FIG. 4 is a cross-sectional view schematically showing the atomic cell 100 according to the embodiment. FIG. 5 is an enlarged view of a region A shown in FIG. 4. FIG. 6 is a perspective view schematically showing the atomic cell 100 according to the embodiment. In the drawings of the present application, an X axis, a Y axis, and a Z axis are set as three axes orthogonal to one another. Each axis is represented by an arrow, and a tip end side is referred to as a "plus side" and a base end side is referred to as a "minus side". In addition, for example, both a plus side direction and a minus side direction of the X axis are referred to as an "X axis direction". The same applies to a Y axis direction and a Z axis direction.

The atomic cell 100 shown in FIG. 4 includes a substrate 10 and a coating layer 20. As shown in FIG. 5, the coating layer 20 includes a first coating layer 22, a second coating layer 24, and a third coating layer 26.

2.1. Substrate

The substrate 10 includes a body portion 12 and a pair of the window portions 14 and 16 provided with the body portion 12 sandwiched therebetween. As shown in FIG. 4, the body portion 12 has a columnar through hole 13 having an axis extending in the Z axis direction. The through hole 13 forms a part of an inner wall of an internal space S of the atomic cell 100. A cross-sectional shape of the through hole 13 is not limited to a circle, and may be, for example, a polygon such as a quadrangle or a pentagon, and an ellipse. Examples of a constituent material of the body portion 12 include glass, crystal, metal, resin, and silicon.

The window portions 14 and 16 sandwich the body portion 12 in a manner of closing the through hole 13. The window portions 14 and 16 each have a plate shape extending along an X-Y plane. The window portions 14 and 16 form another portion of the inner wall of the internal space S. That is, the inner wall of the internal space S is formed by the through hole 13 of the body portion 12 and the window portions 14 and 16. The internal space S is filled with the alkali metal in the gaseous state. A part of the alkali metal filling the internal space S may be present as a gas, and the remaining part may be present as a surplus component in a form of a liquid or a solid. In addition, in the internal space S, as necessary, a rare gas such as argon or neon, or an inert gas such as nitrogen may be sealed as a buffer gas together with the alkali metal.

The window portions 14 and 16 each have a through hole 17 communicating with the internal space S. The through hole 17 is sealed with a sealing material 18. Accordingly, the internal space S can be hermetically sealed. Examples of a constituent material of the sealing material 18 include a metal material such as a silver solder and an Au/Sn alloy, and low melting point glass such as vanadium-based glass. The through hole 17 may be formed only in one of the window portions 14 and 16.

The constituent material of the window portions 14 and 16 is a material through which the excitation light L emitted from the light emitting unit 210 of the atomic oscillator 200 passes. The excitation light L excites the gaseous alkali metal. In addition, the constituent material of the window portions 14 and 16 includes a compound having a polar group. Specifically, examples of the constituent material of the window portions 14 and 16 include quartz glass and borosilicate glass. Examples of the polar group include a hydroxyl group.

2.2. Coating Layer

Figure 7:
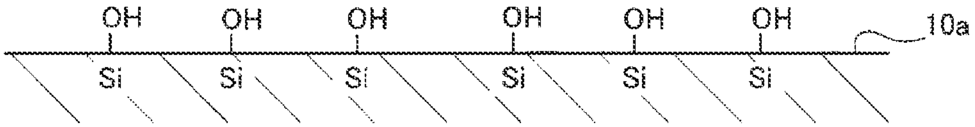
FIG. 7 is a cross-sectional view schematically showing an inner wall of a substrate before a coating layer in FIG. 5 is formed.
Figure 8:
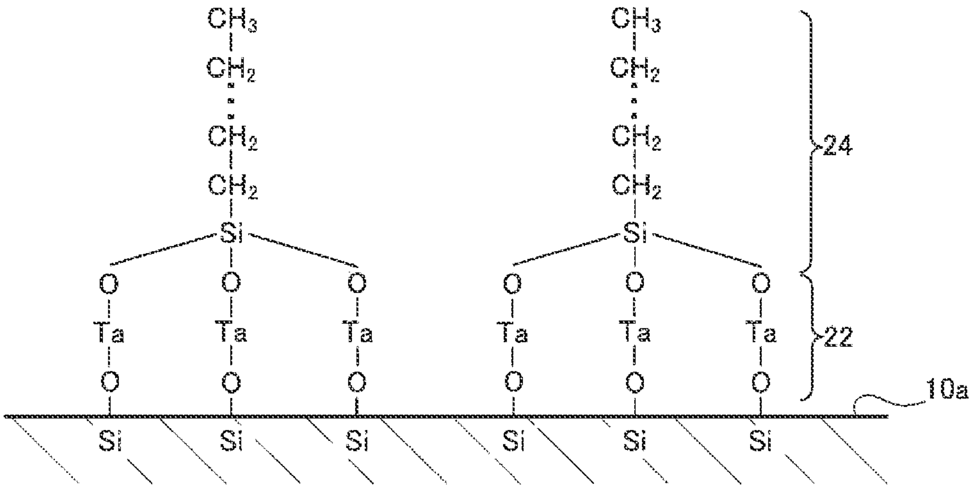
FIG. 8 is a cross-sectional view schematically showing a first coating layer and a second coating layer that are formed on the inner wall shown in FIG. 7.

FIG. 7 is a cross-sectional view schematically showing an inner wall 10*a* of the substrate 10 before the coating layer 20 in FIG. 5 is formed. FIG. 8 is a cross-sectional view schematically showing the first coating layer 22 and the second coating layer 24 that are formed on the inner wall 10*a* shown in FIG. 7.

As shown in FIG. 7, the inner wall 10*a* made of a material containing a compound having the above-described polar group has, for example, a hydroxyl group. Since the constituent material of the window portions 14 and 16 described above contains silicon and oxygen, such a hydroxyl group is easily present on the inner wall 10*a*, which is useful in the formation of the coating layer 20.

A thickness of the coating layer 20 is not particularly limited, and is preferably 10 nm or more and 3000 nm or less, and more preferably 50 nm or more and 1000 nm or less. When the thickness of the coating layer 20 is less than the lower limit value, relaxation of an electron spin state of the alkali metal may not be sufficiently prevented depending on the composition or the like of the coating layer 20. On the other hand, when the film thickness of the coating layer 20 exceeds the upper limit value, a long-term stability of the coating layer 20 may decrease depending on the composition or the like of the coating layer 20.

The thickness of the coating layer 20 can be measured based on an observation result by, for example, a microscope such as a transmission electron microscope (TEM), a scanning tunneling microscope (STM), or an atomic force microscope (AFM).

2.2.1. First Coating Layer

The first coating layer 22 is provided on a surface of the inner wall 10*a* of the substrate 10. The first coating layer 22 may be provided at least on the inner walls of the window portions 14 and 16 in the inner wall 10*a*, and as shown in FIG. 4, the first coating layer 22 is preferably provided on the inner walls of the window portions 14 and 16 and an inner wall of the body portion 12. Although not shown, the first coating layer 22 may be provided on an inner wall of the sealing material 18. A thickness of the first coating layer 22 is, for example, preferably 1 nm or more and 1000 nm or less, and more preferably 10 nm or more and 100 nm or less.

The first coating layer 22 is formed of a first molecule that is a metal oxide. That is, the first coating layer 22 is formed of a compound derived from the first molecule. As the metal oxide, an oxide of any metal may be used, and in particular, a tantalum oxide ($TaO_x$), a zirconium oxide ($ZrO_x$), a hafnium oxide ($HfO_x$), or a titanium oxide ($TiO_x$) is preferably used. As shown in FIG. 8, oxygen of the first molecule substitutes the hydroxyl group present on the inner wall 10*a*, and bonds a metal atom of the first molecule and silicon present on the inner wall 10*a*. In FIG. 8, tantalum atoms are shown as examples of metal atoms.

The metal oxide described above is a metal oxide that hardly chemically reacts with an alkali metal. That is, the oxygen of the first molecule bonding the metal atom of the first molecule and the silicon of the constituent material of the inner wall 10*a* is not substituted with the alkali metal. Accordingly, it is possible to reduce the chance that the coating layer 20 is peeled off from the inner wall 10*a*.

2.2.2. Second Coating Layer

The second coating layer 24 is provided on a surface of the first coating layer 22 (laminated on the first coating layer 22). A thickness of the second coating layer 24 is, for example, preferably 1 nm or more and 1000 nm or less, more preferably 5 nm or more and 500 nm or less, and still more preferably 10 nm or more and 300 nm or less.

The second coating layer 24 is formed of a second molecule having a non-polar group and a reactive group that undergoes a desorption reaction with the first coating layer 22. Specifically, the second coating layer 24 is formed by chemically reacting the reactive group of the second molecule with the first coating layer 22. That is, the second coating layer 24 is formed of a compound derived from the second molecule.

Examples of the second molecule forming the second coating layer 24 include a coupling agent, a metal alkoxide, an alcohol, and a polyimide.

As the second molecule, various coupling agents are preferably used, and a silane coupling agent is more preferably used. The coupling agent generally has a reactive group and a functional group, and is used for the purpose of introducing the functional group into an object to be treated. The coupling agent used as the second molecule has a non-polar group as the functional group. By using the coupling agent, various non-polar groups can be introduced into the second coating layer 24 at high density. Accordingly, chemical bonding or physical adsorption can be caused between the second coating layer 24 and the third coating layer 26, and peeling between the second coating layer 24 and the third coating layer 26 can be particularly prevented. As a result, it is possible to improve a heat resistance of the atomic cell 100, and it is possible to implement the atomic oscillator 200 that stably operates without using an expensive heat dissipation mechanism even in a high-temperature environment in which, for example, direct sunlight is incident.

In the coupling agent, the reactive group and the non-polar group are located at opposite end portions of a molecular chain. Therefore, when the reactive group is bonded to the first coating layer 22, a probability of the non-polar group being oriented to an opposite side from the first coating layer 22 increases. Accordingly, when a third molecule is supplied to a surface of the second coating layer 24, orientation and adhesion of the third molecule can be easily improved. As a result, the third coating layer 26 having a high degree of crystallinity and adhesion force is finally obtained.

When the second molecule is, for example, a silane coupling agent, the second molecule is represented by the following Formula (I). Other coupling agents are the same as those of the silane coupling agent described below.

(I)

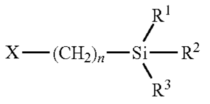

In Formula (I), each of $R^1$, $R^2$ and $R^3$ independently represents a hydrogen atom, an alkoxy group, a halogen atom, or an alkyl group. At least one of $R^1$, $R^2$ and $R^3$ is an alkoxy group or a halogen atom which is a reactive group. $R^1$, $R^2$ and $R^3$ may be the same as or different from one another. n is, for example, an integer of 1 or more and 20 or less, preferably 4 or more and 18 or less, and more preferably 6 or more and 12 or less. In the present specification, $—(CH_2)_n—$ bond is referred to as a spacer. In addition, X is a non-polar group.

When the reactive group is, for example, an alkoxy group, the alkoxy group is substituted with the oxygen derived from the first molecule by a desorption reaction such as a dehydration reaction or a dealcoholization reaction. As a result, as shown in FIG. 8, the oxygen derived from the first molecule binds to, for example, a metal atom derived from the first molecule and a silicon atom of the second molecule. In addition, when the reactive group is, for example, a halogen atom, the halogen atom is substituted with the oxygen derived from the first molecule.

The number of reactive groups present in one molecule is preferably 2 or 3, and more preferably 3. The larger the number of the reactive groups, the higher the adhesion force when the second molecule is bonded to the first coating layer 22. Accordingly, the second coating layer 24 is less likely to peel off.

Examples of the non-polar group X include a linear alkyl group, a cycloalkyl group, a vinyl group, an alkenyl group, and a phenyl group. Among these groups, the non-polar group of the coupling agent is preferably a linear alkyl group, a vinyl group, or a phenyl group. Accordingly, a particularly strong intermolecular attractive force between the non-polar group and the third coating layer 26 derived from the non-polar third molecule is generated. Accordingly, the adhesion force between the second coating layer 24 and the third coating layer 26 can be particularly increased.

When the non-polar group X is a long-chain alkyl group, the non-polar group X and the spacer can be regarded as the long-chain alkyl group. In this case, the number of carbon atoms of the long-chain alkyl group is preferably 6 or more and 24 or less, and more preferably 10 or more and 20 or less. Accordingly, non-polarity of the second coating layer 24 is particularly significant, and the second coating layer 24 can impart high orientation to the third molecule, so that the crystallinity of the third coating layer 26 can be particularly improved. As a result, it is possible to effectively prevent the electron spin state of the alkali metal filling the atomic cell 100 from being relaxed. The second coating layer 24 shown in FIG. 8 illustrates an example in which the non-polar group X is a long-chain alkyl group.

Examples of the silane coupling agent containing such a long-chain alkyl group include octadecyltrimethoxysilane (ODS, $CH_3(CH_2)_{17}Si(OCH_3)_3$) or octadecyltrichlorosilane (OTS, $CH_3(CH_2)_{17}SiCl_3$).

Figure 9:
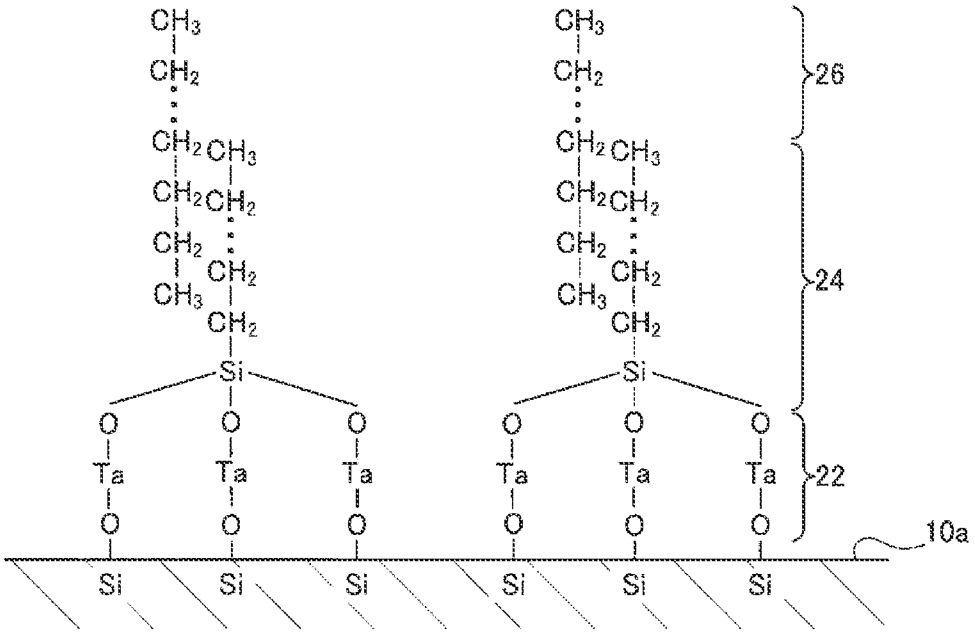
FIG. 9 is a schematic view showing a state in which, when a silane coupling agent containing a long-chain alkyl group is used as a second molecule and paraffin is used as a third molecule, the third molecule is physically adsorbed to the second molecule.

When the non-polar group X is a long-chain alkyl group, the third molecule forming the third coating layer 26 is physically adsorbed to the second molecule forming the second coating layer 24. FIG. 9 is a schematic view showing a state in which, when the silane coupling agent containing the long-chain alkyl group is used as the second molecule and paraffin is used as the third molecule, the third molecule is physically adsorbed to the second molecule. Since the paraffin is a non-polar molecule but has a large molecular weight, a strong intermolecular attractive force is generated between the paraffin and the long-chain alkyl group of the second molecule. Accordingly, as shown in FIG. 9, the paraffin which is the third molecule is physically adsorbed to the long-chain alkyl group of the second molecule.

When the non-polar group X is a vinyl group, the non-polarity of the second coating layer 24 is particularly significant. Accordingly, the second coating layer 24 can impart the high orientation to the third molecule, and the crystallinity of the third coating layer 26 can be particularly improved. The third molecule forming the third coating layer 26 is physically adsorbed to the second molecule forming the second coating layer 24.

When the non-polar group X is a vinyl group, for example, by a graft reaction of the vinyl group, at least a part of the third molecule forming the third coating layer 26 may be chemically bonded to the second molecule forming the second coating layer 24. Since the second molecule and the third molecule are chemically bonded to each other, the adhesion force between the second coating layer 24 and the third coating layer 26 can be further increased.

When the non-polar group X is a vinyl group, the number of carbon atoms of the spacer is preferably 2 or more and 14 or less, and more preferably 6 or more and 12 or less. Accordingly, since a degree of freedom of the vinyl group is improved, a reactivity of the vinyl group is particularly high, and the degree of crystallinity and the adhesion force of the third coating layer 26 can be particularly improved.

When the non-polar group X is a phenyl group, the non-polarity of the second coating layer 24 is particularly significant. Accordingly, the second coating layer 24 can impart the high orientation to the third molecule, and the crystallinity of the third coating layer 26 can be particularly improved. The third molecule forming the third coating layer 26 is physically adsorbed to the second molecule forming the second coating layer 24.

When the non-polar group X is a phenyl group, for example, by a CH/π interaction or a π/π interaction, at least a part of the third molecule forming the third coating layer 26 can be chemically bonded to the second molecule forming the second coating layer 24. Accordingly, the adhesion force between the second coating layer 24 and the third coating layer 26 can be further increased.

When the non-polar group X is a phenyl group, the number of carbon atoms of the spacer is preferably 2 or more and 14 or less, and more preferably 6 or more and 12 or less. Accordingly, since a degree of freedom of the phenyl group is improved, a reactivity of the phenyl group is particularly high, and the degree of crystallinity and the adhesion force of the third coating layer 26 can be particularly improved.

When the second molecule forming the second coating layer 24 is a metal alkoxide, examples of the second molecule include a titanium coupling agent, an aluminum coupling agent, and a zirconium coupling agent.

When the second molecule forming the second coating layer 24 is an alcohol, examples of the second molecule include linear alcohols such as decyl alcohol and octadecyl alcohol.

2.2.3. Third Coating Layer

The third coating layer 26 is provided on a surface of the second coating layer 24 (laminated on the second coating layer 24). The third coating layer 26 is formed of the non-polar third molecule. That is, the third coating layer 26 is formed of a compound derived from the third molecule. A thickness of the third coating layer 26 is, for example, preferably 1 nm or more and 1000 nm or less, more preferably 5 nm or more and 500 nm or less, and still more preferably 10 nm or more and 300 nm or less.

The degree of crystallinity of the third coating layer 26 is 70% or more due to the action of the second coating layer 24. According to the third coating layer 26 having such a degree of crystallinity, it is possible to obtain the coating layer 20 which is particularly hard to adsorb the alkali metal atom. As a result, the effect of preventing the relaxation of the electron spin state of the alkali metal filling the atomic cell 100 can be sufficiently increased.

The degree of crystallinity of the third coating layer 26 may be 70% or more, preferably 75% or more, and more preferably 80% or more.

The degree of crystallinity of the third coating layer 26 can be obtained based on an X-ray diffraction spectrum of the third coating layer 26 obtained by an X-ray diffraction method. Specifically, first, an X-ray diffraction spectrum of the coating layer 20 is obtained by the X-ray diffraction method. In the X-ray diffraction spectrum, a diffraction peak derived from a crystal component contained in the third coating layer 26 and a halo pattern derived from an amorphous component are mixed. Therefore, profile fitting is performed on the diffraction peak or the halo pattern based on data of a standard sample and a database. Accordingly, the diffraction peak and the halo pattern can be separated, and an area of the diffraction peak derived from the crystal component and an area of the halo pattern derived from the amorphous component can be obtained. Then, the degree of crystallinity [%] is obtained by the following calculation formula.

$$\text{degree of crystallinity [\%]} = \frac{\text{area of diffraction peak}}{\text{area of diffraction peak} + \text{area of halo pattern}}$$

Depending on an incident angle of X-rays in the X-ray diffraction method, the X-ray diffraction spectrum may be affected by the second coating layer 24 and the first coating layer 22. In such a case, by reducing the incident angle of the X-rays with respect to the surface of the coating layer 20, these influences can be reduced.

Examples of the third molecule forming the third coating layer 26 include polypropylene (PP), polyethylene (PE), polymethylpentene (PMP), paraffin, diacetylene, and diene. Since these third molecules are non-polar molecules, the non-polar groups are easily arranged with respect to the second coating layer 24 oriented outward. As a result, the third coating layer 26 having a high degree of crystallinity is obtained. In addition, a direction in which the third molecule is arranged is a direction intersecting the inner wall 10_a_. That is, a major axis of the third molecule is arranged in a direction intersecting the surface of the inner wall 10_a_. The arrangement in the intersecting direction refers to a state in which an angle formed by an extending direction of the major axis of the third molecule and the surface of the inner wall 10_a_ is 45° or more and 90° or less. In addition, the angle is preferably 60° or more and 90° or less.

The third molecule is particularly preferably paraffin or diacetylene. By the action of the second coating layer 24, it is possible to form the third coating layer 26 having a particularly high crystallinity as compared with when PP, PE, PMP, or the like is used as the third molecule. Therefore, by using these third molecules, it is possible to form the third coating layer 26 which is particularly hard to adsorb the alkali metal atom.

In the present specification, an alkane having 20 or more carbon atoms is referred to as paraffin. The paraffin is represented by the following Formula (II).

$$C_nH_{2n+2} \qquad \text{(II)}$$

In Formula (II), n is preferably 20 or more, and more preferably 25 or more and 100 or less.

As represented by Formula (II), since the paraffin is a non-polar and inactive long-chain saturated hydrocarbon, the paraffin is particularly, densely, and easily aligned with respect to the non-polar group of the second coating layer 24. Therefore, by using the paraffin as the third molecule, the third coating layer 26 which is particularly hard to adsorb the alkali metal atom is obtained. Therefore, by using the paraffin as the third molecule, the effect of preventing the relaxation of the electron spin state of the alkali metal is more significant.

When the third coating layer 26 is derived from the paraffin, a rocking curve of a paraffin (110) plane can be obtained from the X-ray diffraction spectrum of the third coating layer 26. A half-value width of the rocking curve is preferably 10° or less, and more preferably 5° or less. At this time, it can be said that a degree of paraffin orientation in the third coating layer 26 is high. Therefore, the third coating layer 26 that satisfies the above condition contributes to the implementation of the coating layer 20 which is particularly hard to adsorb the alkali metal atom.

The diacetylene is represented by the following Formula (III).

$$R^4C{\equiv}C{-}C{\equiv}CR^5 \qquad \text{(III)}$$

In Formula (III), $R^4$ and $R^5$ are each preferably an alkyl group. $R^4$ and $R^5$ may be the same alkyl group or different alkyl groups. The alkyl group may be branched, and is preferably linear from the viewpoint of further reducing surface free energy of the coating layer 20. The number of carbon atoms of the alkyl group is preferably 6 or more and 24 or less, more preferably 8 or more and 20 or less, and still more preferably 10 or more and 18 or less. By setting the number of carbon atoms within the above range, the degree of crystallinity of the third coating layer 26 can be easily increased.

A triple bond contained in the diacetylene is cleaved by energy application such as heating to cause solid phase polymerization. Accordingly, a polydiacetylene compound is obtained. The polydiacetylene compound is a polymer obtained by polymerizing and crosslinking adjacent diacetylene monomers. In the polydiacetylene compound, a site derived from a substituent of the diacetylene is a side chain extending from a crosslinking site. The side chain is particularly, densely, and easily aligned with respect to the non-polar group of the second coating layer 24. Accordingly, the third coating layer 26 having an excellent film strength due to the crosslinking site and having particularly small surface free energy is obtained. As a result, it is possible to implement the coating layer 20, which is difficult to be peeled off and in which the effect of preventing the relaxation of the electron spin state of the alkali metal is particularly significant.

The third coating layer 26 derived from the diacetylene has an excellent heat resistance. That is, by forming a film by solid phase polymerization, the third coating layer 26, which is less likely to be peeled off from the second coating layer 24 even under a high temperature, is obtained. Accordingly, it is possible to implement the atomic cell 100 and the atomic oscillator 200 which are excellent in resistance at a high temperature.

2.3. Effects According to Embodiment

As described above, the atomic cell 100 according to the embodiment is filled with the alkali metal and includes the substrate 10, the first coating layer 22, the second coating layer 24, and the third coating layer 26. The first coating layer 22 is provided on the inner wall 10*a* of the substrate 10 and is derived from the first molecule. The second coating layer 24 is provided on the first coating layer 22, and is derived from the second molecule having the non-polar group and the reactive group that undergoes the desorption reaction with the first molecule. The third coating layer 26 is provided on the second coating layer 24 and is derived from the non-polar third molecule. The third coating layer 26 has a degree of crystallinity of 70% or more.

According to such a configuration, since the degree of crystallinity of the third coating layer 26 is high, the alkali metal atom is particularly hard to be adsorbed to the third coating layer 26. Therefore, it is possible to obtain the atomic cell 100 in which the effect of preventing the relaxation of the electron spin state of the alkali metal filling the atomic cell 100 is sufficiently high. By using such an atomic cell 100, for example, in the atomic oscillator 200, an intensity of the EIT signal can be increased, and a line width of the EIT signal (a half-value width of the EIT signal) can be reduced. As a result, the atomic oscillator 200 having an excellent frequency stability is obtained.

As described above, the third molecule is preferably paraffin or diacetylene. The paraffin is a non-polar and inactive long-chain saturated hydrocarbon, the paraffin is particularly, densely, and easily aligned with respect to the non-polar group of the second coating layer 24. Therefore, when the third molecule is the paraffin, the third coating layer 26 which is particularly hard to adsorb the alkali metal atom is obtained. The diacetylene forms the third coating layer 26 having an excellent film strength due to solid phase polymerization, and is particularly, densely, and easily aligned with respect to the non-polar group of the second coating layer 24. Therefore, when the third molecule is the diacetylene, the third coating layer 26, which is particularly hard to adsorb the alkali metal atom and is less likely to be peeled off, is obtained.

As described above, the first molecule is preferably a tantalum oxide, a zirconium oxide, a hafnium oxide, or a titanium oxide. Since these metal oxides hardly chemically react with the alkali metal, the chance of the coating layer 20 being peeled off from the inner wall 10*a* can be reduced.

As described above, the second molecule is preferably a coupling agent. By using the coupling agent as the second molecule, various non-polar groups can be introduced into the second coating layer 24 at high density. Accordingly, peeling between the second coating layer 24 and the third coating layer 26 can be particularly prevented. In addition, since the non-polar group can be oriented on the opposite side from the first coating layer 22 using self-organization of the coupling agent, the third molecule can be easily aligned. Accordingly, the third coating layer 26 having a particularly high degree of crystallinity is obtained.

The non-polar group of the second molecule is preferably a linear alkyl group. Accordingly, the non-polarity of the second coating layer 24 is particularly significant. As a result, the second coating layer 24 can impart the high orientation to the third molecule, and the crystallinity of the third coating layer 26 can be particularly improved.

The non-polar group of the second molecule is preferably a vinyl group. Accordingly, the non-polarity of the second coating layer 24 is particularly significant. As a result, the second coating layer 24 can impart the high orientation to the third molecule, and the crystallinity of the third coating layer 26 can be particularly improved. In addition, by a graft reaction of the vinyl group, the third molecule forming the third coating layer 26 can be bonded to the second molecule forming the second coating layer 24.

The non-polar group of the second molecule is preferably a phenyl group. Accordingly, the non-polarity of the second coating layer 24 is particularly significant. As a result, the second coating layer 24 can impart the high orientation to the third molecule, and the crystallinity of the third coating layer 26 can be particularly improved. In addition, by a CH/n interaction or a n/n interaction of the phenyl group, the third molecule forming the third coating layer 26 can be bonded to the second molecule forming the second coating layer 24.

3. Method for Manufacturing Atomic Cell

Next, a method for manufacturing the atomic cell 100 will be described.

Figure 10:
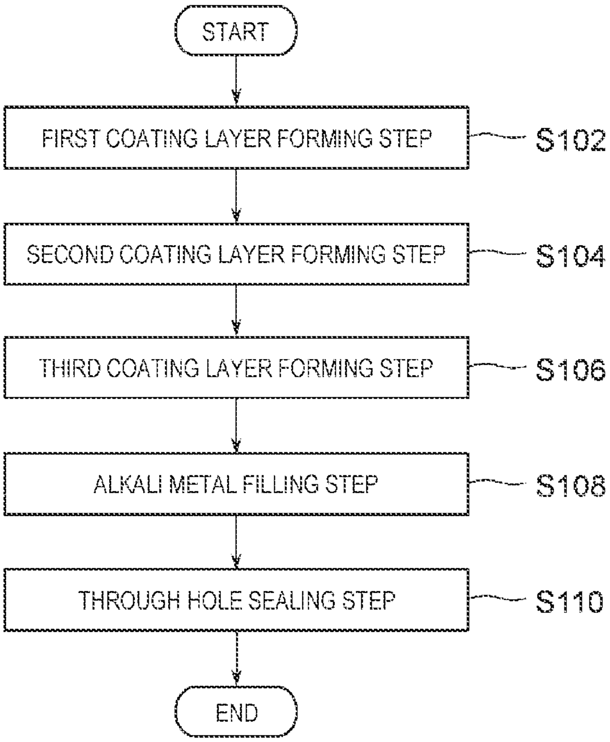
FIG. 10 is a process diagram showing a method for manufacturing the atomic cell shown in FIG. 4.
Figure 11:
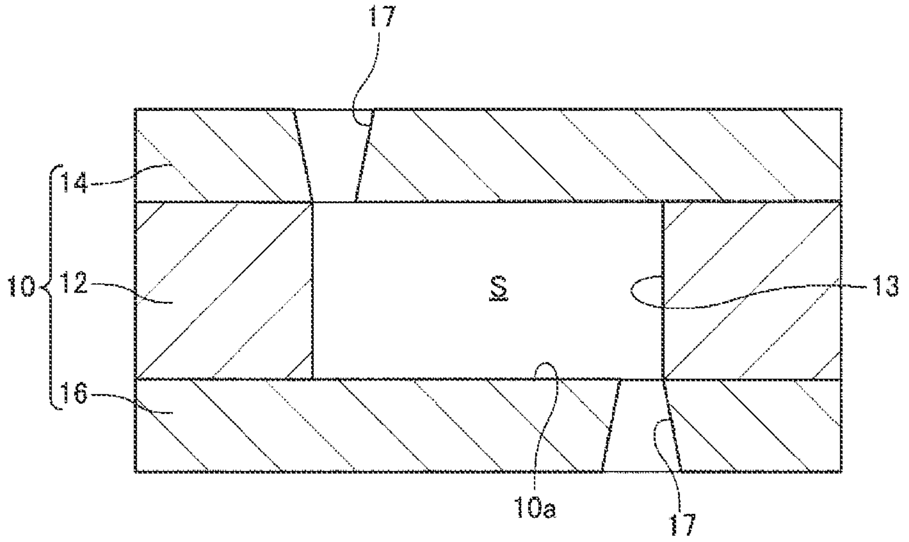
FIG. 11 is a cross-sectional view showing the method for manufacturing the atomic cell shown in FIG. 10.
Figure 12:
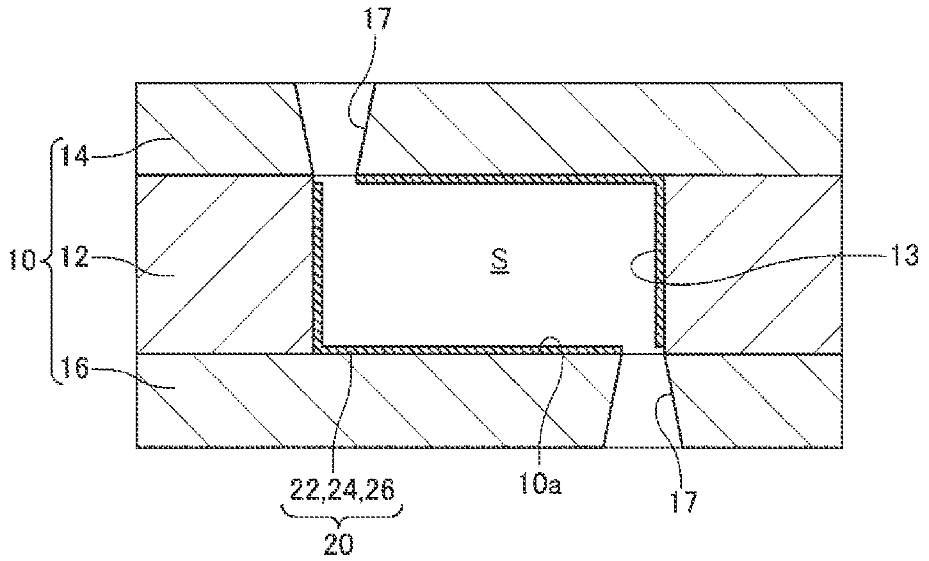
FIG. 12 is a cross-sectional view showing the method for manufacturing the atomic cell shown in FIG. 10.

FIG. 10 is a process diagram showing the method for manufacturing the atomic cell 100 shown in FIG. 4. FIGS. 11 and 12 are cross-sectional views showing the method for manufacturing the atomic cell 100 shown in FIG. 10.

The method for manufacturing the atomic cell 100 shown in FIG. 10 includes a first coating layer forming step S102, a second coating layer forming step S104, a third coating layer forming step S106, an alkali metal filling step S108, and a through hole sealing step S110. Hereinafter, the steps will be described.

3.1. First Coating Layer Forming Step

In the first coating layer forming step S102, the first molecule is supplied to the inner wall 10*a* of the substrate 10 shown in FIG. 11. Accordingly, the first coating layer 22 shown in FIG. 12 is formed. Examples of a method for supplying the first molecule include a chemical vapor deposition (CVD) method, an atomic layer deposition (ALD) method, a sputtering method, an ion plating method, and a sol-gel method. Among these methods, when the first coating layer 22 is formed by the CVD method, the first molecule in the gaseous state is deposited on the surface of the inner wall 10*a* through the through holes 17.

3.2. Second Coating Layer Forming Step

In the second coating layer forming step S104, the second molecule is supplied to the first coating layer 22. The second molecule has a reactive group that undergoes the desorption reaction with the first molecule, and a non-polar group. Accordingly, the second coating layer 24 shown in FIG. 12 is formed. Examples of the method for supplying the second molecule include a coating method and a CVD method. Among these methods, when the second coating layer 24 is formed by the coating method, the second molecule is dispersed in a predetermined dispersion medium, and the obtained dispersion liquid is applied to the surface of the first coating layer 22 through the through holes 17, and then dried. When the second coating layer 24 is formed by the CVD method, the second molecule in the gaseous state is deposited on the surface of the first coating layer 22 through the through holes 17.

3.3. Third Coating Layer Forming Step

In the third coating layer forming step S106, the third molecule is supplied to the second coating layer 24. Accordingly, the third coating layer 26 shown in FIG. 12 is formed. Examples of the method for supplying the third molecule include a coating method and a vacuum deposition method. Among these methods, when the third coating layer 26 is formed by the coating method, the third molecule is dispersed in a predetermined dispersion medium, and the obtained dispersion liquid is applied to the surface of the second coating layer 24 through the through holes 17, and then dried. When the third coating layer 26 is formed by the vacuum deposition method, the third molecule in the gaseous state is deposited on the surface of the second coating layer 24 through the through holes 17. As described above, the coating layer 20 shown in FIG. 12 is obtained.

If necessary, the supplied third molecule is heated at a temperature equal to or higher than a melting point of the third molecule. Accordingly, the supplied third molecule moves and is oriented, and is self-organized. Accordingly, the degree of crystallinity of the obtained third coating layer 26 can be further increased. For example, when the third molecule is paraffin, a melting point of the paraffin is about 80° C. to 100° C. Therefore, it is preferable to heat the third molecule at a temperature higher than 100° C. and preferably at a temperature higher than the melting point by 10° C. or higher. An upper limit value may vary depending on other conditions such as a heating time, and may be set to a temperature, for example, about 200° C., at which the third molecule is not modified by heat.

The heating time may be appropriately set according to a heating temperature, and may be set while checking a state of the orientation. As an example, the heating time is set to about 30 seconds or more and 60 minutes or less. A heating atmosphere may be an air atmosphere, and is preferably an inert gas atmosphere in consideration of oxidation of the third molecule or the like.

On the other hand, when the third molecule is diacetylene, it is preferable to perform a heating treatment of heating the third molecule at a temperature of 100° C. or higher and 120° C. or lower after supplying the third molecule to the second coating layer 24. By such a heating treatment, the third molecule can be subjected to solid phase polymerization, and can be easily polymerized in a state in which the crystallinity is high. Since the obtained polydiacetylene has a particularly high degree of crystallinity, the particularly high-quality third coating layer 26 is obtained.

When the heating temperature is less than the lower limit value, the solid phase polymerization of the third molecule may not sufficiently proceed, and the degree of crystallinity of the third coating layer 26 may not be sufficiently increased. On the other hand, when the heating temperature exceeds the upper limit value, the crystallized third molecule may be modified to lower the degree of crystallinity.

A time of the heating treatment is not particularly limited, and is preferably 1 minute or more and 180 minutes or less, and more preferably 5 minutes or more and 120 minutes or less.

Further, an atmosphere of the heating treatment is not particularly limited, and is preferably an inert gas atmosphere such as a nitrogen atmosphere or an argon atmosphere. Accordingly, the degree of crystallinity of the third coating layer 26 can be further increased.

3.4. Alkali Metal Filling Step

In the alkali metal filling step S108, the internal space S is filled with the alkali metal in the gaseous state through the through holes 17. The alkali metal fills the internal space S under a condition that the coating layer 20 does not melt.

3.5. Through Hole Sealing Step

In the through hole sealing step S110, the through hole 17 is sealed with the sealing material 18. Specifically, a sealing material member in a form of a ball fills the through hole 17, and then is melted by a laser or the like. Accordingly, the sealing material 18 that seals the through hole 17 can be formed. As a result, the internal space S filled with the alkali metal can be hermetically sealed.

The atomic cell 100 can be manufactured as described above.

3.6. Effects According to Embodiment

As described above, the method for manufacturing the atomic cell 100 according to the embodiment is a method for manufacturing an atomic cell filled with an alkali metal, and includes the first coating layer forming step S102, the second coating layer forming step S104, and the third coating layer forming step S106. In the first coating layer forming step S102, the first coating layer 22 is formed by supplying the first molecule to the inner wall 10*a* of the substrate 10. In the second coating layer forming step S104, the second coating layer 24 is formed by supplying, to the first coating layer 22, the second molecule having the non-polar group and the reactive group that undergoes the desorption reaction with the first coating layer 22. In the third coating layer forming step S106, the third coating layer 26 is formed by supplying the non-polar third molecule to the second coating layer 24. The third coating layer 26 has a degree of crystallinity of 70% or more.

According to such a configuration, since the degree of crystallinity of the third coating layer 26 is high, the alkali metal atom is particularly hard to be adsorbed to the third coating layer 26. Therefore, it is possible to manufacture the atomic cell 100 in which the effect of preventing the relaxation of the electron spin state of the alkali metal filling the atomic cell 100 is sufficiently high.

A water contact angle of the second coating layer 24 is preferably 70° or more and 120° or less, and more preferably 80° or more and 120° or less. The fact that the water contact angle of the second coating layer 24 is within the above range supports that the non-polar group of the second molecule is oriented in a more densely and more highly aligned state. Therefore, when the water contact angle of the second coating layer 24 is within the above range, the degree of crystallinity of the third coating layer 26 can be particularly increased.

When the water contact angle is less than the lower limit value, the degree of crystallinity of the third coating layer 26 may decrease. On the other hand, when the water contact angle exceeds the upper limit value, it is difficult to efficiently form the second coating layer 24, and the difficulty of formation may increase.

The water contact angle of the second coating layer 24 is measured by a θ/2 method. Measurement conditions are a temperature of 25° C. and a relative humidity of 50%±5%. A water dropping amount is 3 μL, and the measurement is performed 5 seconds after drop adhesion. Examples of a measuring device of a contact angle include a contact angle measuring device Drop Master 500 manufactured by Kyowa Interface Science Co., Ltd.

When the third molecule is diacetylene, the third coating layer forming step S106 preferably includes a heating treatment of heating the third molecule at a temperature of 100° C. or higher and 120° C. or lower after supplying the third molecule to the second coating layer 24.

According to the third coating layer forming step S106, the third molecule can be subjected to solid phase polymerization, and can be easily polymerized in a state in which the crystallinity is high. Since the obtained polydiacetylene has a particularly high degree of crystallinity, the particularly high-quality third coating layer 26 is obtained.

As described above, the atomic oscillator 200 (quantum interference device according to the embodiment) includes the atomic cell 100, the light emitting unit 210, and the light detection unit 230. The light emitting unit 210 emits the excitation light L for exciting the alkali metal. The light detection unit 230 detects the excitation light L transmitted through the atomic cell 100.

According to such a configuration, a quantum interference device such as the atomic oscillator 200 capable of attaining the effects of the atomic cell 100 can be obtained. In addition, in the light detection unit 230, it is possible to detect the EIT signal having a higher intensity and a smaller line width (half-value width of the EIT signal). Accordingly, the atomic oscillator 200 (quantum interference device) having an excellent frequency stability is obtained.

4. Electronic Device

Figure 13:
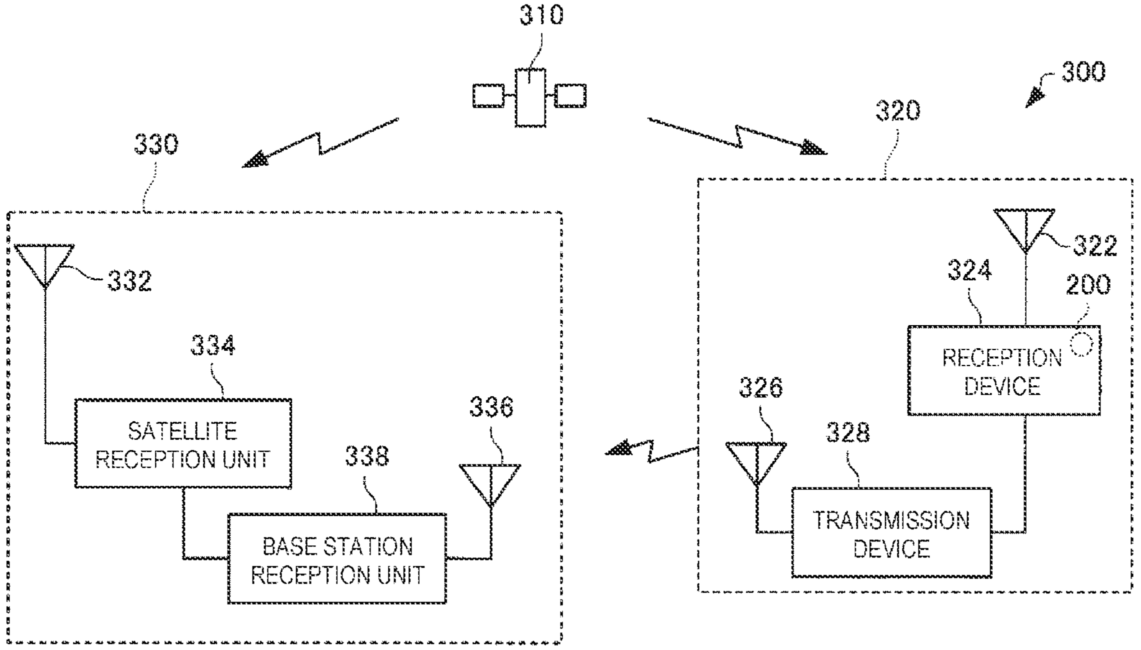
FIG. 13 is a diagram showing a positioning system that includes the atomic oscillator and uses a global positioning system (GPS) satellite.

Next, an electronic device including the atomic oscillator 200 will be described. Hereinafter, a positioning system including the atomic oscillator 200 as the electronic device will be described. FIG. 13 is a diagram showing a positioning system 300 that includes the atomic oscillator 200 and that uses a global positioning system (GPS) satellite.

As shown in FIG. 13, the positioning system 300 includes a GPS satellite 310, a base station device 320, and a GPS reception device 330.

The GPS satellite 310 transmits positioning information (GPS signal).

The base station device 320 includes, for example, a reception device 324 that receives the positioning information from the GPS satellite 310 with high accuracy via an antenna 322 disposed on an electronic reference point (GPS continuous observation station), and a transmission device 328 that transmits, via an antenna 326, the positioning information received by the reception device 324. The reception device 324 includes the atomic oscillator 200 as a reference frequency oscillation source. The positioning information received by the reception device 324 is transmitted in real time by the transmission device 328.

The GPS reception device 330 includes a satellite reception unit 334 that receives the positioning information from the GPS satellite 310 via an antenna 332, and a base station reception unit 338 that receives positioning information from the base station device 320 via an antenna 336.

Since the positioning system 300 as described above includes the atomic oscillator 200, the positioning system 300 has excellent accuracy and reliability.

The electronic device is not limited to the positioning system, and may be, for example, a mobile phone, a digital still camera, an ink jet discharging device, a personal computer, a television, a video camera, a video tape recorder, a car navigation device, a pager, an electronic notebook, an electronic dictionary, a calculator, an electronic game device, a word processor, a workstation, a video phone, a security television monitor, electronic binoculars, a POS terminal, a medical device, a fish finder, various measuring devices, meters, a flight simulator, a terrestrial digital broadcasting, and a mobile phone base station.

5. Vehicle

Figure 14:
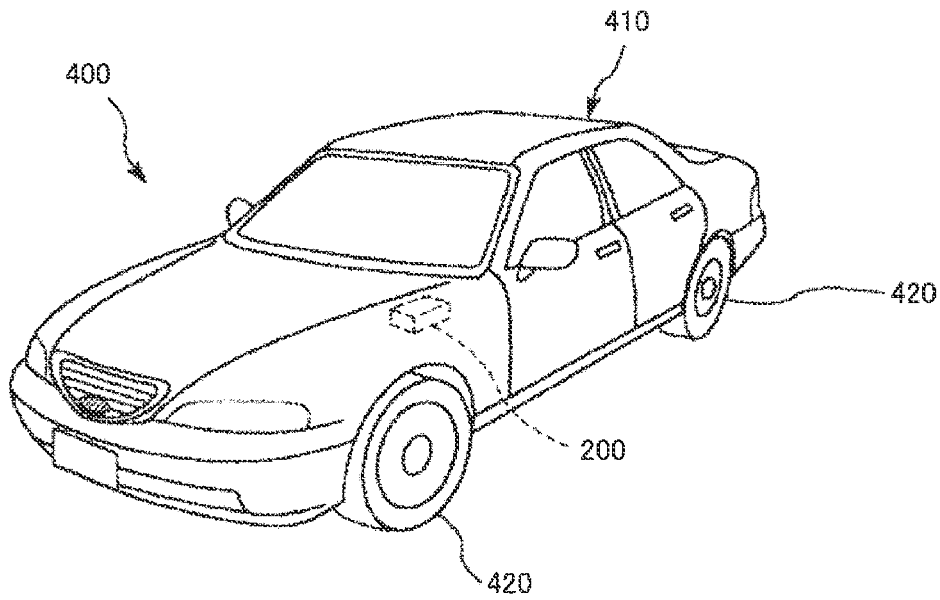
FIG. 14 is a diagram showing an automobile including the atomic oscillator.

Next, a vehicle including the atomic oscillator 200 will be described. Hereinafter, an automobile including the atomic oscillator 200 as the vehicle will be described. FIG. 14 is a diagram showing an automobile 400 including the atomic oscillator 200.

As shown in FIG. 14, the automobile 400 includes a vehicle body 410 and four wheels 420, and is configured to rotate the wheels 420 by a power source (engine) (not shown) provided in the vehicle body 410. The automobile 400 includes the atomic oscillator 200.

Since the automobile 400 includes the atomic oscillator 200, the automobile 400 has excellent accuracy and reliability.

The vehicle is not limited to the automobile, and may be, for example, an aircraft such as a jet machine or a helicopter, a ship, a rocket, and an artificial satellite.

Although the atomic cell, the method for manufacturing the atomic cell, and the quantum interference device according to the present disclosure have been described above based on the illustrated embodiment, the present disclosure is not limited thereto.

For example, in the atomic cell and the quantum interference device according to the present disclosure, a configuration of each part of the above embodiment may be replaced with any configuration having the same function, and any constituent may be added to the above embodiment.

In the method for manufacturing the atomic cell according to the present disclosure, any desired step may be added to the embodiment.

What is claimed is:

1. An atomic cell filled with an alkali metal, the atomic cell comprising:

a substrate;

a first coating layer provided on an inner wall of the substrate and derived from a first molecule;

a second coating layer provided on the first coating layer, and derived from a second molecule having a non-polar group and a reactive group that undergoes a desorption reaction with the first molecule; and a third coating layer provided on the second coating layer and derived from a non-polar third molecule, wherein the third coating layer has a degree of crystallinity of 70% or more.

2. The atomic cell according to claim 1, wherein the third molecule is paraffin or diacetylene.

3. The atomic cell according to claim 2, wherein the second molecule is a coupling agent.

4. A quantum interference device comprising:

the atomic cell according to claim 2;

a light emitting unit configured to emit excitation light for exciting the alkali metal; and a light detection unit configured to detect the excitation light transmitted through the atomic cell.

5. The atomic cell according to claim 1, wherein the first molecule is a tantalum oxide, a zirconium oxide, a hafnium oxide, or a titanium oxide.

6. The atomic cell according to claim 5, wherein the second molecule is a coupling agent.

7. The atomic cell according to claim 2, wherein the first molecule is a tantalum oxide, a zirconium oxide, a hafnium oxide, or a titanium oxide.

8. The atomic cell according to claim 7, wherein the second molecule is a coupling agent.

9. A quantum interference device comprising:

the atomic cell according to claim 7;

a light emitting unit configured to emit excitation light for exciting the alkali metal; and a light detection unit configured to detect the excitation light transmitted through the atomic cell.

10. A quantum interference device comprising:

the atomic cell according to claim 8;

a light emitting unit configured to emit excitation light for exciting the alkali metal; and a light detection unit configured to detect the excitation light transmitted through the atomic cell.

11. The atomic cell according to claim 1, wherein the second molecule is a coupling agent.

12. The atomic cell according to claim 11, wherein the non-polar group is a linear alkyl group.

13. The atomic cell according to claim 11, wherein the non-polar group is a vinyl group.

14. The atomic cell according to claim 11, wherein the non-polar group is a phenyl group.

15. A quantum interference device comprising:

the atomic cell according to claim 1;

a light emitting unit configured to emit excitation light for exciting the alkali metal; and a light detection unit configured to detect the excitation light transmitted through the atomic cell.

16. A method for manufacturing an atomic cell filled with an alkali metal, the method comprising:

forming a first coating layer by supplying a first molecule to an inner wall of a substrate;

forming a second coating layer by supplying, to the first coating layer, a second molecule having a non-polar group and a reactive group that undergoes a desorption reaction with the first coating layer; and forming a third coating layer by supplying a non-polar third molecule to the second coating layer, wherein the third coating layer has a degree of crystallinity of 70% or more.

17. The method for manufacturing an atomic cell according to claim 16, wherein the second coating layer has a water contact angle of 70° or more and 120° or less.

18. The method for manufacturing an atomic cell according to claim 17, wherein the third molecule is diacetylene, and the forming of the third coating layer includes a heating treatment of heating the third molecule at a temperature of 100° C. or higher and 120° C. or lower after supplying the third molecule to the second coating layer.

19. The method for manufacturing an atomic cell according to claim 16, wherein the third molecule is diacetylene, and the forming of the third coating layer includes a heating treatment of heating the third molecule at a temperature of 100° C. or higher and 120° C. or lower after supplying the third molecule to the second coating layer.

* * * * *